United States Patent
Schafranek et al.

(10) Patent No.: US 6,615,285 B1
(45) Date of Patent: Sep. 2, 2003

(54) METHOD AND APPARATUS FOR DYNAMICALLY DETERMINING AN ADDRESS UNIQUELY IDENTIFYING A HARDWARE COMPONENT ON A COMMON BUS

(75) Inventors: Alex Schafranek, West Orange, NJ (US); Keith Elden Strege, Branchburg Township, Somerset County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/198,098

(22) Filed: Nov. 23, 1998

(51) Int. Cl.[7] ............................................. G06F 13/14
(52) U.S. Cl. ..................... 710/3; 340/825.07; 345/156; 345/163
(58) Field of Search ................ 710/3, 104; 340/825.07; 345/156, 163

(56) References Cited

U.S. PATENT DOCUMENTS

| | | | | |
|---|---|---|---|---|
| 4,413,318 A | * | 11/1983 | Herrington | 364/200 |
| 4,638,313 A | | 1/1987 | Sherwood, Jr. et al. | |
| 4,773,005 A | * | 9/1988 | Sullivan | 710/9 |
| 4,847,834 A | * | 7/1989 | Bryant | 370/449 |
| 5,317,693 A | * | 5/1994 | Cuenod et al. | 710/9 |
| 5,680,113 A | * | 10/1997 | Allen et al. | 340/825.05 |
| 5,708,831 A | * | 1/1998 | Schon | 395/800 |
| 5,745,699 A | * | 4/1998 | Lynn et al. | 709/245 |
| 5,835,725 A | * | 11/1998 | Chiang et al. | 709/228 |
| 5,877,745 A | * | 3/1999 | Beeteson et al. | 345/156 |
| 5,898,845 A | * | 4/1999 | Frantz et al. | 710/104 |
| 6,009,479 A | * | 12/1999 | Jeffries | 710/8 |
| 6,094,053 A | * | 7/2000 | Harvey | 324/434 |
| 6,157,527 A | * | 12/2000 | Spencer et al. | 361/64 |
| 6,185,638 B1 | * | 2/2001 | Beardsley et al. | 710/36 |
| 6,195,712 B1 | * | 2/2001 | Pawlowski et al. | 710/19 |

FOREIGN PATENT DOCUMENTS

EP    0 486 818 A1    5/1992

OTHER PUBLICATIONS

L.A. Baxter et al., "System 75: Communications and Control Architecture," AT&T Technical Journal, vol. 64, No. 1, 153–173 (Jan. 1985).

* cited by examiner

Primary Examiner—Abdelmoniem Elamin

(57) ABSTRACT

A method and apparatus are disclosed for dynamically determining a bus address that uniquely identifies a hardware component on a common bus. In an illustrative cell station implementation, each cell station includes a hardware controller that communicates on a common bus with a plurality of hardware components. The address space is logically divided into two ranges, namely, a first range of addresses referred to as the common access addresses, and a second range of addresses referred to as the assigned addresses. One address is reserved for the primary node that is responsible for assigning addresses, such as the hardware controller. Thus, each hardware component communicates with the hardware controller on one of the common access addresses to request a channel, and thereafter communicates on an assigned address, once assigned by the hardware controller. Collisions between multiple hardware components on the common access channels are minimized by assigning multiple channels.

14 Claims, 3 Drawing Sheets

METHOD AND APPARATUS FOR DYNAMICALLY DETERMINING AN ADDRESS UNIQUELY IDENTIFYING A HARDWARE COMPONENT ON A COMMON BUS

CROSS REFERENCE TO RELATED APPLICATION

The present invention is related to United States Patent Application entitled "Method And Apparatus For Determining An Address Uniquely Identifying A Hardware Component On A Common Bus," U.S. Ser. No. 09/198,289, filed contemporaneously herewith, assigned to the assignee of the present invention and incorporated by reference herein.

FIELD OF THE INVENTION

The present invention relates to a method and apparatus for assigning bus addresses, and more particularly, to a method and apparatus for dynamically assigning bus addresses to hardware components installed on equipment, such as a cell station.

BACKGROUND OF THE INVENTION

Conventional cellular telephone systems include a central control station that interconnects the cellular telephone system with any suitable telephone switching system, such as the Public Switched Telephone Network (PSTN), and one or more cell stations. The cell stations are generally remote from the central control station and are typically placed throughout a cellular telephone service area. Telephone calls may be selectively placed by the central control station between standard land line telephone subscribers of the PSTN and a cellular telephone unit or directly between two cellular telephone units, in a known manner. For a more detailed description of a suitable cellular telephone system, see, for example, U.S. Pat. No. 4,829,554, incorporated by reference herein.

In order for a cell station to perform required functions, the cell station typically incorporates hardware components, often referred to as "circuit packs." The same cell station, for example, might include a set of transceivers and other hardware equipment, such as control and timing boards, for communicating with cellular telephone units in a known manner. In addition, a cell station can include one or more interface boards for communicating, for example, on a T1 line with a switch of the PSTN. In order for the cell station to properly communicate with and supervise each of the various hardware components, the cell station also includes a hardware controller. The hardware controller and each of the hardware components are typically stored by the cell station on a frame or rack.

In the event of a hardware component failure or when routine servicing is required, a given hardware component on a cell station might be replaced by a compatible piece of hardware, having a different manufacturer, model number or version. In addition, additional hardware components may be added to the cell station to increase the capacity of the cell station, or the cell station configuration may otherwise be modified. As each new hardware component is added to a cell station, the hardware component must typically be associated with a particular sector (antenna) and carrier frequency on the cell station.

Each hardware component typically communicates with the hardware controller and with one another on a common bus. In order to differentiate each hardware component on the common bus, each hardware component is assigned a unique address. The hardware controller maintains a directory that maps the sector and carrier frequency associated with each hardware component, as well as the corresponding bus address. The system configuration information stored by the hardware controller must match the physical hardware components that are actually installed on the cell station.

Some systems for determining system configuration information, however, including sector, carrier frequency and bus assignments for each hardware component, are labor-intensive and require considerable manual effort. Specifically, an operator typically manually enters the relationship between the physical address of each hardware component and the corresponding logical connection (sector and carrier frequency) for all hardware components installed on a given cell station. In addition, each slot often has a prewired address. When a hardware component is plugged into the slot, the hardware component reads the address value from the backplane and uses the address to communicate with other hardware components and the hardware controller on the common bus. Since the prewired backplane address has little or no physical location information, manually generated conversion information is needed to convert the backplane address to an understanding of the type of hardware component that is at that address, as well as the sector and carrier frequency associated with the hardware component.

As apparent from the above-described deficiencies with conventional techniques for obtaining system configuration information, a need exists for a technique for automatically determining system configuration information and for assigning addresses on a common bus.

SUMMARY OF THE INVENTION

Generally, according to one aspect of the invention, a method and apparatus are disclosed for dynamically determining an address that uniquely identifies a hardware component on a common bus. In an illustrative cell station implementation, each cell station includes a hardware controller that communicates on a common bus with a plurality of hardware components.

According to an aspect of the invention, each hardware component dynamically obtains a bus address that uniquely identifies the hardware component on the common bus. The address space is logically divided into two ranges, namely, a first range of addresses referred to as the common access addresses, and a second range of addresses referred to as the assigned addresses. One address is reserved for the primary node that is responsible for assigning addresses, such as the hardware controller. Thus, each hardware component communicates with the hardware controller on one of the common access addresses to request a channel, and thereafter communicates on an assigned address, once assigned by the hardware controller.

Collisions between multiple hardware components on the common access channels are minimized by allocating one address in the common access address space for each device type. Thus, hardware components of a different type can execute the access procedure in parallel since they access on a different common access channel. In an alternate implementation, collisions are minimized by allocating a plurality of common access addresses and having each hardware component randomly select a common access address. Assigning multiple channels for common access reduces the bus initialization time, since hardware components are less likely to have to wait for the appropriate access channel.

A hardware component may access the bus to obtain an assigned address by first listening to hear if any other hardware component is transmitting using the same common access channel. If the common access channel is clear, the hardware component sends an identification message to the hardware controller using the address reserved for the hardware controller. The common access address is associated with the identification message so the hardware controller may respond to the hardware component with an address assignment message on the hardware component's common access address. The address assignment message carries a new address assignment chosen by the hardware controller from the assigned address space. All further communication by the accessing hardware component takes place using the assigned address. Thereafter, the common access address is available for another hardware component to use.

A more complete understanding of the present invention, as well as further features and advantages of the present invention, will be obtained by reference to the following detailed description and drawings.

DETAILED DESCRIPTION

Figure 1:
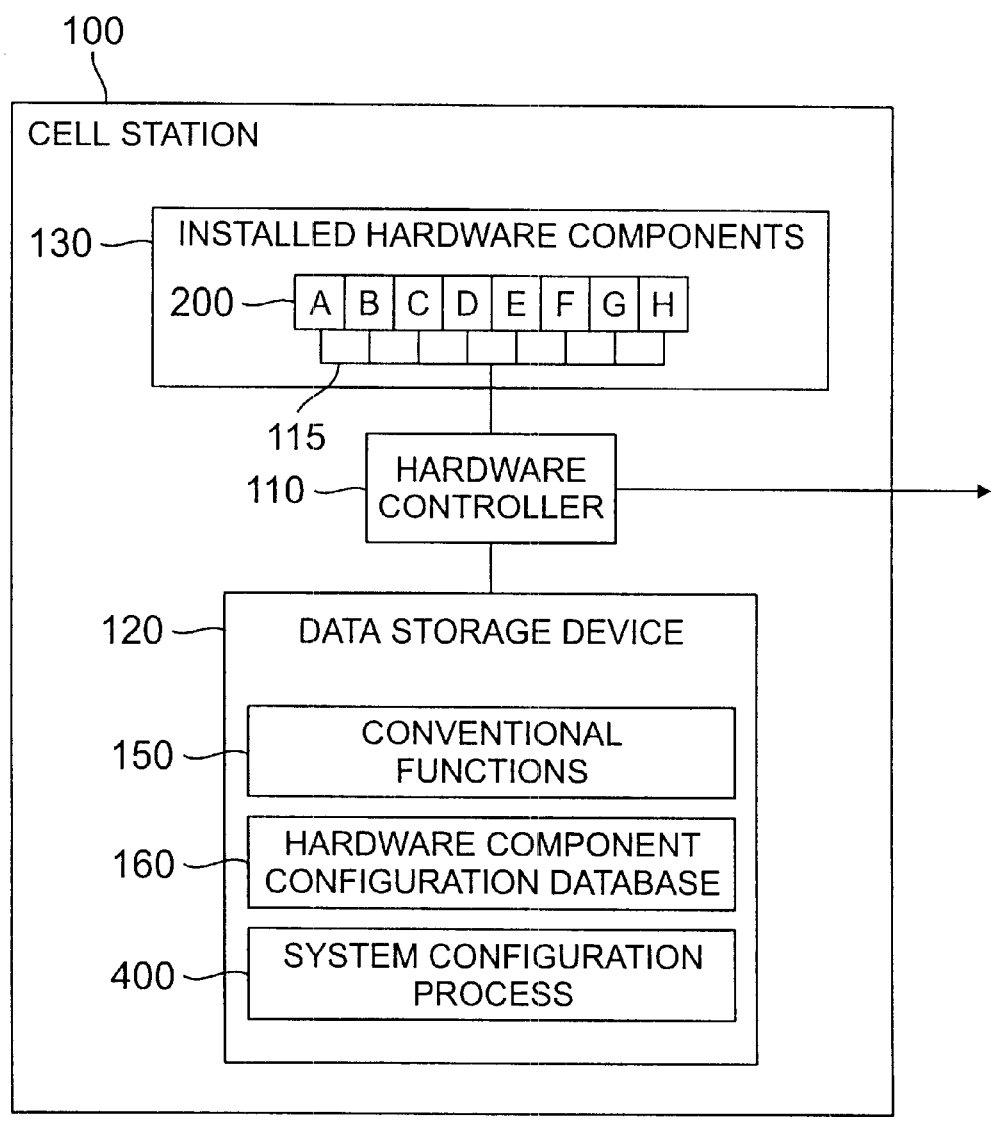
FIG. 1 is a schematic block diagram illustrating a cell station, in accordance with the present invention.

FIG. 1 is a block diagram showing the architecture of an illustrative cell station 100 in accordance with the present invention. The cell station 100 preferably includes a hardware controller 110 that communicates on a common bus 115 with a plurality of hardware components 200A–200H. The hardware components 200A–200H may be installed, for example, on one or more frames or racks 130 on the cell station 100. The hardware components 200A–200H, such as an illustrative hardware component 200, are discussed further below in conjunction with FIG. 2.

Figure 3:
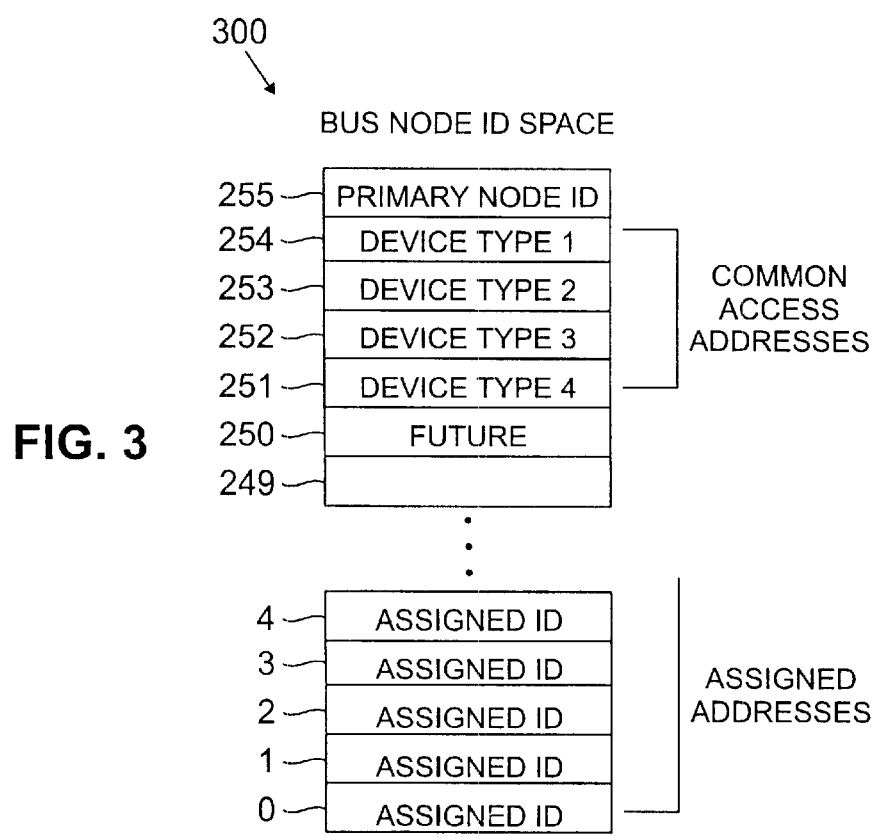
FIG. 3 illustrates an illustrative partitioning of the bus address space in accordance with the present invention to allocate common access channels and assigned addressses.

According to a feature of the present invention, each hardware component 200A–200H dynamically obtains a bus address that uniquely identifies the hardware component 200A–200H on the common bus 115. As shown in FIG. 3, the present invention logically divides the address space into two ranges, namely, a first range of addresses referred to herein as the common access addresses, and a second range of addresses referred to herein as the assigned addresses. The size of each address space can change to meet the needs of a given system, as apparent to a person of ordinary skill in the art. In theory, the present invention supports up to N-2 hardware components, where N is the size of the address space (with the two exceptions being the hardware controller 110 and at least one common access address). Thus, each hardware component communicates with the hardware controller 110 on one of the common access addresses to request a channel, and thereafter communicates on one of the assigned addresses, once assigned by the hardware controller 10.

According to a further feature of the invention, collisions between multiple hardware components on the common access channels are minimized. In one embodiment, collisions are minimized by allocating one address in the common access address space for each device type. Thus, for example, all of the hardware components of a particular device type would request an address using address 253. Thus, hardware components of a different type can execute the access procedure in parallel since they access on a different common access channel. If two hardware components of the same type both try to access the common bus 115 at the same moment, "backoff and retry" mechanisms can be implemented. This situation is handled, as in typical random access schemes, by including a unique value from the accessing hardware component in the address assignment message exchange. The unique value could be some hardware-derived number, such as a serial number, or simply a random number. In this manner, the accessing hardware component can ensure that the address assignment message is intended for it by checking the address assignment message for the appropriate unique value.

In an alternate implementation, collisions are minimized by allocating a plurality of common access addresses and having each hardware component randomly select a common access address. Assigning multiple channels for common access also serves to reduce the bus initialization time, since hardware components are less likely to have to wait for the appropriate access channel.

Generally, bus initialization begins when the hardware controller 110 begins transmitting on the common bus 115. The hardware components 200A–200H do not transmit on the common bus 115 until the hardware controller 110 first transmits something. Once the hardware controller 110 transmits on the common bus 115, then a hardware component 200A–200H may access the bus 115 by first listening to hear if any other hardware component 200A–200H is transmitting using the same common access channel. If the common access channel is clear, the hardware component sends an identification message to the hardware controller 110 using the address assigned to the hardware controller 110. The common access address is associated with the identification message so the hardware controller 110 may respond to the hardware component.

The hardware controller 110 then sends an address assignment message back to the hardware component 200A–200H on the hardware component's common access address. The address assignment message carries a new address assignment chosen by the hardware controller 110 from the assigned address space. For example, the address assignments may be assigned sequentially from the assigned address space. All further communication by the accessing hardware component takes place using the assigned address. Thereafter, the common access address is available for another hardware component to use.

Once all of the hardware components have executed the access procedure, they continue to operate using their assigned address until they execute a hardware reset, upon which the hardware component must go through the access procedure again to obtain a (possibly different) address. In addition, once the bus addresses for the hardware component are assigned in accordance with the present invention, the cell station 100 operates normally, forwarding the messages that are received from the central control station (not shown) to the hardware components 200A–200H and vice versa, as required.

As shown in FIG. 1, the cell station 100 preferably includes a hardware controller 110 and related memory, such as a data storage device 120, which may be distributed or local. The hardware controller 110 may be embodied as a single processor, or a number of local or distributed processors operating in parallel. The data storage device 120 and/or a read only memory (ROM) are operable to store one or more instructions, which the hardware controller 110 is operable to retrieve, interpret and execute.

The data storage device 120 preferably includes the code 150 to perform supervisory, control functions and other conventional functions for communicating with cellular telephones and a central control station (not shown). For a detailed description of conventional functions of a cell station 100, see, for example, U.S. Pat. No. 4,829,554, incorporated by reference above. In addition, the data storage device 120 includes a hardware component configuration database 160 for storing the carrier frequency, frame, sector number (such as $\alpha$, $\beta$, $\gamma$), unit type and unit number associated with each hardware component on the cell station 100. In addition, the data storage device 120 includes a system configuration process 400, discussed below in conjunction with FIG. 4, that communicates with the hardware components 200A–200H to compile the configuration information and generate the hardware component configuration database 160.

It is noted that the cell station 100 can provide the local configuration information to a central cell controller (not shown), as would be apparent to a person of ordinary skill in the art. In this manner, the central cell controller can remotely determine the configuration of each cell station, such as the cell station 100.

Figure 2:
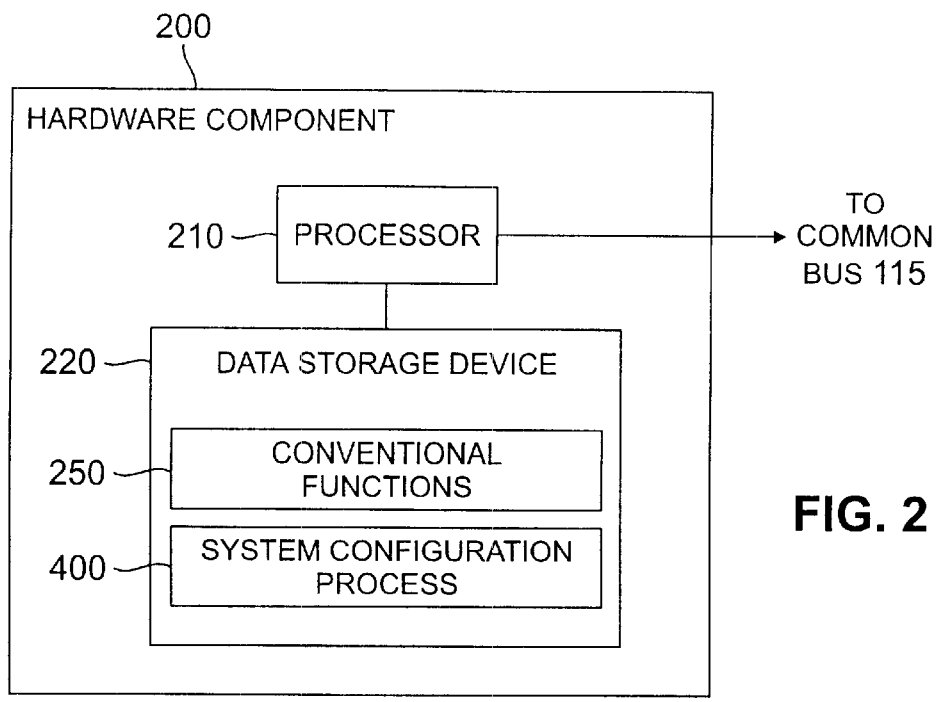
FIG. 2 is a schematic block diagram illustrating a hardware component of FIG. 1, in accordance with the present invention.

FIG. 2 is a block diagram showing the architecture of an illustrative hardware component 200 in accordance with the present invention. As shown in FIG. 2, each hardware component 200 includes a processor 210 and related memory, such as a data storage device 220, which may be distributed or local. The processor 210 may be embodied as a single processor, or a number of local or distributed processors operating in parallel. The data storage device 220 and/or a read only memory (ROM) are operable to store one or more instructions, which the processor 210 is operable to retrieve, interpret and execute.

The data storage device 220 preferably includes the code 250 to perform conventional functions for communicating with the hardware controller 110 of FIG. 1. In addition, the data storage device 120 includes a system configuration process 400, discussed below in conjunction with FIG. 4, that cooperates with the hardware controller 110 to dynamically obtain a bus address for the hardware component and to provide information identifying the hardware component to the hardware controller 110.

Figure 4:
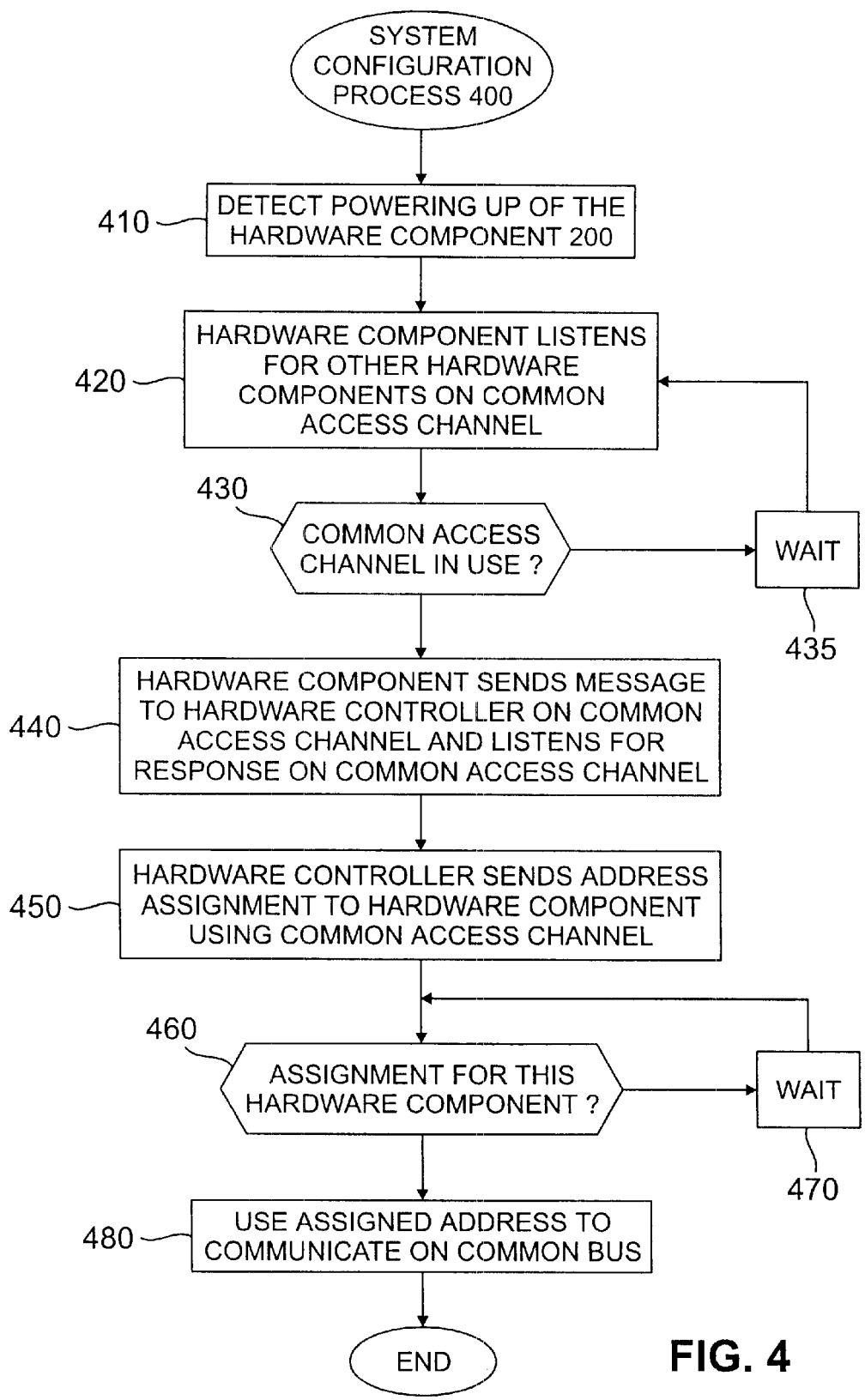
FIG. 4 is a flow chart describing an exemplary system configuration process performed by the hardware component of FIG. 2.

As previously indicated, the hardware controller 110 and each hardware component 200 cooperatively implement a system configuration process 400, such as the illustrative process shown in FIG. 4, to dynamically assign bus addresses for each hardware component and to provide information identifying the hardware component to the hardware controller 110.

As shown in FIG. 4, the system configuration process 400 is initiated during step 410 upon the powering up of the hardware component 200. Thereafter, the hardware component listens for other hardware components during step 420 on a common access channel. In the illustrative embodiment, the hardware component listens for other hardware components on a common access channel assigned for its device type.

A test is performed during step 430 to determine if the common access channel is being used. If it is determined during step 430 that the common access channel is being used, then program control waits for a predefined period during step 435 before returning to step 420 and continuing in the manner described above. If, however, it is determined during step 430 that the common access channel is not being used, then the hardware component sends a message to the hardware controller 110 on the appropriate common access channel during step 440, and listens for a response on the appropriate common access channel. The initial message sent to the hardware controller 110 may include, for example, an indication of the configuration information for the hardware component, such as the carrier frequency, sector, unit type and unit number.

The hardware controller 110 then sends an address assignment to the hardware component during step 450 using the common access channel upon which the request was received. As previously indicated, the address assignment may include a unique identifier of the hardware component.

A test is performed by the hardware component during step 460 to determine if the address assignment is for this hardware component. If it is determined during step 460 that the address assignment is not;for this hardware component, then the hardware component waits for the next address assignment message (or may retransmit its request) during step 470 before program control returns to step 460.

If, however, it is determined during step 460 that the address assignment is for this hardware component, then the hardware component begins using the assigned address for further communications during step 480.

It is to be understood that the embodiments and variations shown and described herein are merely illustrative of the principles of this invention and that various modifications may be implemented by those skilled in the art without departing from the scope and spirit of the invention.

We claim:

1. A method for dynamically determining an address that uniquely identifies a hardware component on a common bus, said method comprising the steps of:
   requesting an address on a common access channel from among a plurality of addresses allocated to said common access channels; and
   receiving an assigned address for further communication on said bus in response to said request.

2. The method according to claim 1, further comprising the step of assigning at least one common access channel for each type of said hardware component.

3. The method according to claim 1, wherein said address request is sent on a randomly selected one of said plurality of common access channels.

4. The method according to claim 1, further comprising the step of transmitting with said address request identification information describing said hardware component and how said hardware component is located within a larger piece of equipment.

5. A method for allocating an address space on a common bus utilized by a plurality of hardware components, said method comprising the steps of:
   allocating a plurality of addresses in said address space as a common access channel for requesting addresses; and
   allocating a range of addresses in said address space as assigned addresses for communicating with said hardware components in response to said requests on said common access channel.

6. The method according to claim 5, further comprising the step of assigning at least one common access channel for each type of said hardware component.

7. The method according to claim 5, wherein a hardware component randomly selects one of said common access channels for requesting an address.

8. A system for dynamically determining an address that uniquely identifies a hardware component on a common bus, said system comprising:
- a memory for storing computer readable code; and
- a processor operatively coupled to said memory, said processor configured to:
  - request an address on a common access channel from among a plurality of addresses allocated to said common access channels; and
  - receive an assigned address for further communication on said bus in response to said request.

9. The system according to claim 8, wherein at least one common access channel is assigned for each type of said hardware component.

10. The system according to claim 8, wherein said address request is sent on a randomly selected one of said plurality of common access channels.

11. The system according to claim 8, wherein said processor is further configured to transmit with said address request identification information describing said hardware component and how said hardware component is located within a larger piece of equipment.

12. A system for allocating an address space on a common bus utilized by a plurality of hardware components, said system comprising:
- a memory for storing computer readable code; and
- a processor operatively coupled to said memory, said processor configured to:
  - allocate a plurality of addresses in said address space as a common access channel for requesting addresses; and
  - allocate a range of addresses in said address space as assigned addresses for communicating with said hardware components in response to said requests on said common access channel.

13. The system according to claim 12, wherein said processor is further configured to assign at least one common access channel for each type of said hardware component.

14. The system according to claim 12, wherein a hardware component randomly selects one of said common access channels for requesting an address.

* * * * *